(12) United States Patent
Sotelo (10) Patent No.: US 10,150,397 B2
(45) Date of Patent: Dec. 11, 2018

(54) VEHICLE STORAGE STRUCTURE

(71) Applicant: Nissan North America, Inc., Franklin, TN (US)

(72) Inventor: Jorge Sotelo, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 112 days.

(21) Appl. No.: 15/281,275

(22) Filed: Sep. 30, 2016

(65) Prior Publication Data
US 2018/0093601 A1   Apr. 5, 2018

(51) Int. Cl.
*B60N 3/10*   (2006.01)

(52) U.S. Cl.
CPC ............. *B60N 3/108* (2013.01); *B60N 3/101* (2013.01)

(58) Field of Classification Search
CPC ................................. B60N 3/108; B60N 3/101
See application file for complete search history.

(56) References Cited

U.S. PATENT DOCUMENTS

| | | | |
|---|---|---|---|
| 6,059,243 A | 5/2000 | Hikage et al. | |
| 6,478,204 B2 | 11/2002 | Lange et al. | |
| 6,499,785 B2 | 12/2002 | Eguchi | |
| 6,672,554 B2 | 1/2004 | Fukuo | |
| 6,883,852 B2 | 4/2005 | Laskey | |
| 7,168,750 B2 | 1/2007 | Hutek et al. | |
| 7,341,297 B2 * | 3/2008 | Nakamura | B60N 3/083 224/926 |
| 7,475,954 B1 | 1/2009 | Latunski | |
| 7,540,391 B2 | 6/2009 | Kato | |
| 7,721,926 B2 | 5/2010 | Thomas | |
| 7,787,795 B2 | 8/2010 | Sugawara et al. | |
| 8,579,348 B1 | 11/2013 | Myers | |
| 2002/0070220 A1 | 6/2002 | Kuehn et al. | |
| 2005/0189776 A1 | 9/2005 | Sturt | |

* cited by examiner

*Primary Examiner* — D Glenn Dayoan
*Assistant Examiner* — Melissa A Black
(74) *Attorney, Agent, or Firm* — Global IP Counselors, LLP (57) ABSTRACT

A housing structure has a top wall, a pair of tracks and a lid. The top wall has an opening above a storage compartment therein. The opening has a first edge portion. A section of each of the tracks extends along opposite sides of the opening. The lid includes an end portion and a flexible portion. The flexible portion has lateral edges that extend into respective ones of the pair of tracks for selective sliding movement along the pair of tracks between a fully closed position blocking access to the storage compartment, a fully open position exposing the storage compartment via the opening and a plurality of intermediate positions between the fully closed position and the fully open position. The end portion defines a concave leading end. With the lid in a first intermediate position, the concaved leading end and the first edge portion define a cup holder space.

20 Claims, 11 Drawing Sheets

VEHICLE STORAGE STRUCTURE

BACKGROUND

Field of the Invention

The present invention generally relates to a vehicle storage structure. More specifically, the present invention relates to a vehicle storage structure that includes a storage compartment with a lid configured such that a portion of the lid and portions of the storage compartment define a variable size cup holder space.

Background Information

Cup holders are provided within most vehicles. In space limited areas of a vehicle, such cup holders consume valuable space.

SUMMARY

One object of the disclosure is to provide a vehicle storage structure with a multi-purpose storage compartment.

Another object of the disclosure is to provide a vehicle storage structure with storage compartment that can serve as a cup holder space and/or a storage space.

Another object of the disclosure is to provide a vehicle storage structure with storage compartment that can serves a cup holder space that can receive and secure liquid vessels of differing sizes.

In view of the state of the known technology, one aspect of the present disclosure is to provide a vehicle storage structure with a housing structure, a pair of tracks and a lid. The housing structure defines a storage compartment and has a top wall with an opening above the storage compartment. The top wall has a first edge portion that partially defines the opening. The pair of tracks are located within the housing structure with at least a section of each of the pair of tracks extending along opposite sides of the opening within the housing structure. The lid includes an end portion and a flexible portion. The flexible portion has lateral edges that extend into respective ones of the pair of tracks for selective sliding movement along the pair of tracks between a fully closed position blocking access to the storage compartment via the opening, a fully open position exposing the storage compartment via the opening and a plurality of intermediate positions between the fully closed position and the fully open position. The end portion has a concave leading end such that with the lid in a first of the plurality of intermediate positions, the concaved leading end and the first edge portion of the opening in the top wall define a cup holder space configured to receive and surround a first removable liquid vessel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
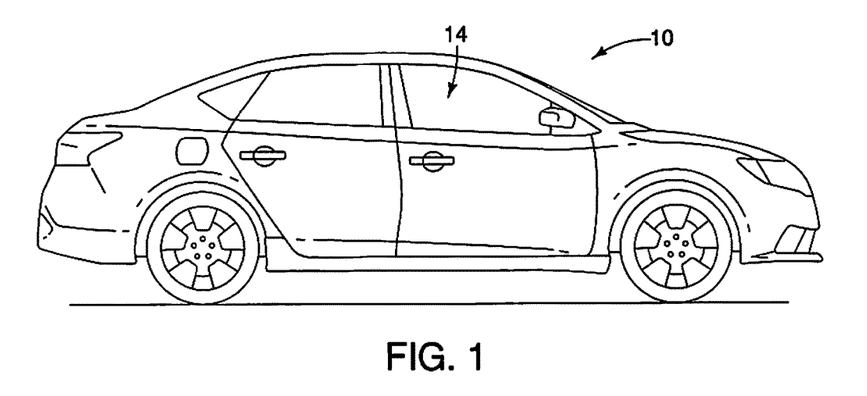
FIG. 1 is a side view of a vehicle having a passenger compartment in accordance with a first embodiment.
Figure 2:
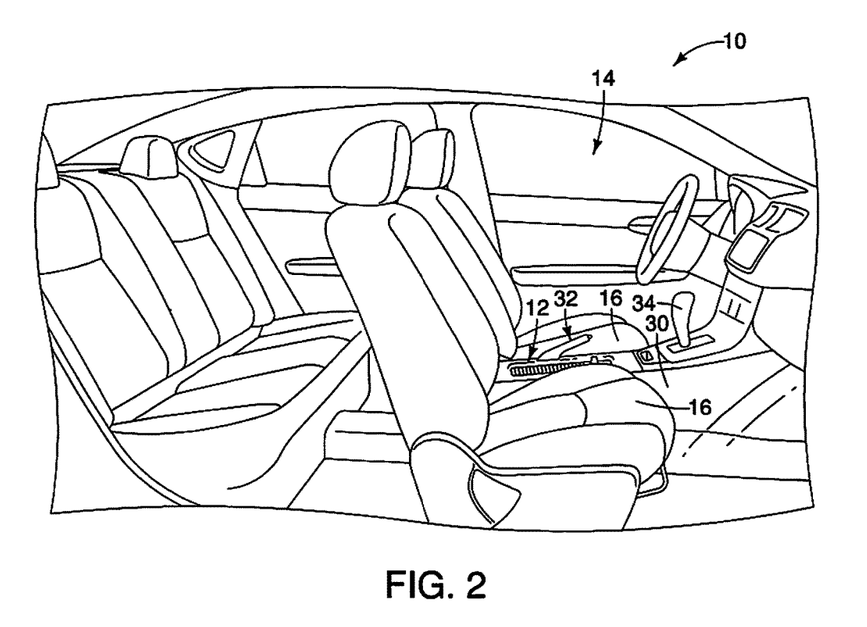
FIG. 2 is a perspective view of the passenger compartment of the vehicle showing a center console that includes a storage structure in accordance with the first embodiment.

Referring initially to FIGS. 1 and 2, a vehicle 10 is illustrated that includes a vehicle storage structure 12 (shown in FIG. 2) within a passenger compartment 14 in accordance with a first embodiment of the present invention. In this illustrated embodiment, the vehicle storage structure 12 is part of a center console that is installed between front seats 16 of the vehicle 10. Preferably, the vehicle storage structure 12 is designed as a trim component that blends in with the interior features of the vehicle 10. Further, in alternative embodiments, the vehicle storage structure 12 can be shaped and arranged for installation in any of a variety of locations within the vehicle 10. For example, the vehicle storage structure 12 can also be re-shaped and installed in a dashboard area of the vehicle 10, beside or between rear seats or other rearward locations within the vehicle 10 adjacent to passenger areas where storage space would be advantageous and a cup holder would be convenient.

The vehicle storage structure 12 is configured as a storage space of small objects or cargo, such as a mobile phone $C_1$ (FIGS. 9, 10 and 13), and is also configured to be used as a cup holder. More specifically, the vehicle storage structure 12 is configured to be adjustable such that any of a variety of shapes and sizes of cups (hereinafter referred to as liquid vessels) can be placed within a portion of the vehicle storage structure, as described in greater detail below.

Figure 3:
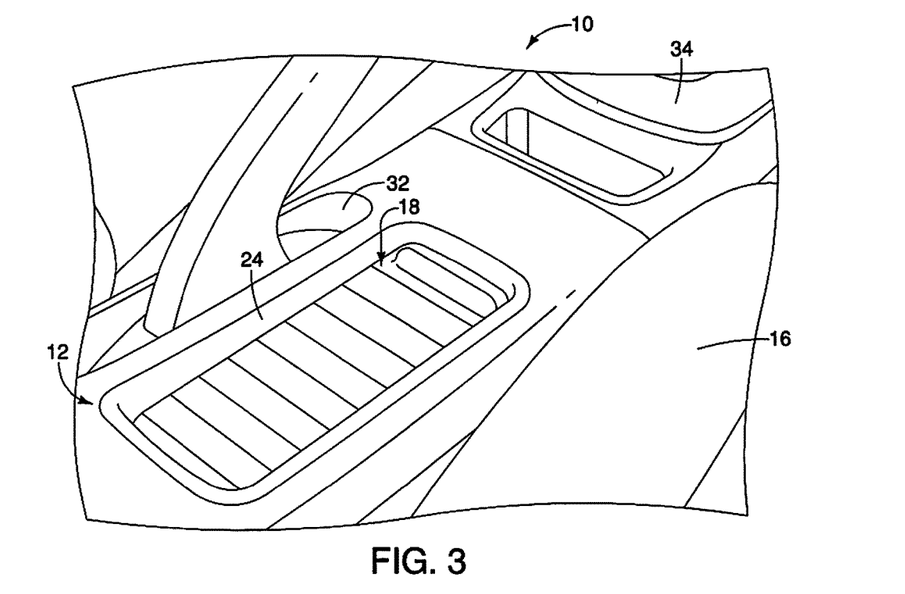
FIG. 3 is a perspective view of the center console depicted in FIG. 2 showing the storage compartment and a sliding lid with the lid in the closed position in accordance with the first embodiment.
Figure 4:
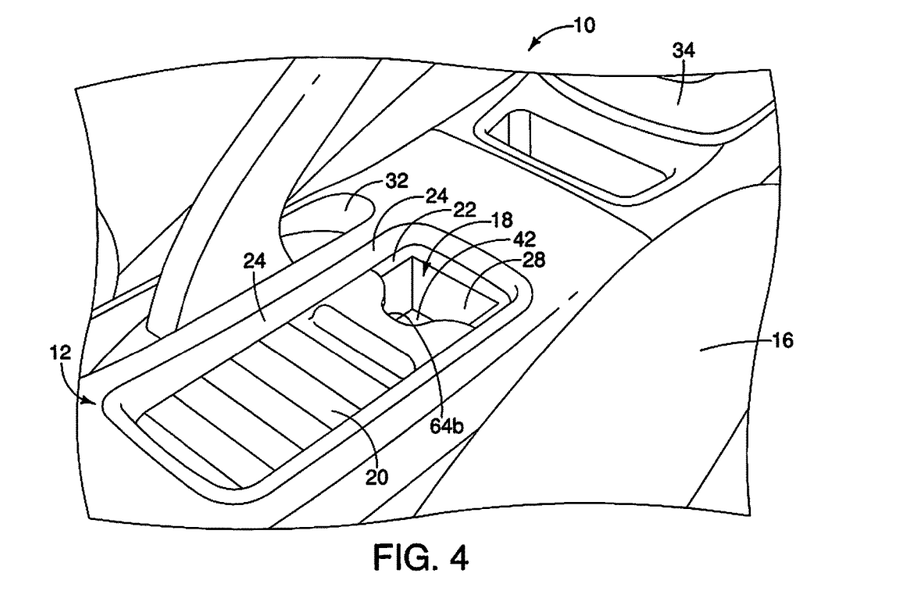
FIG. 4 is another perspective view of the center console similar to FIG. 3 showing the storage compartment with the lid in an open position in accordance with the first embodiment.
Figure 5:
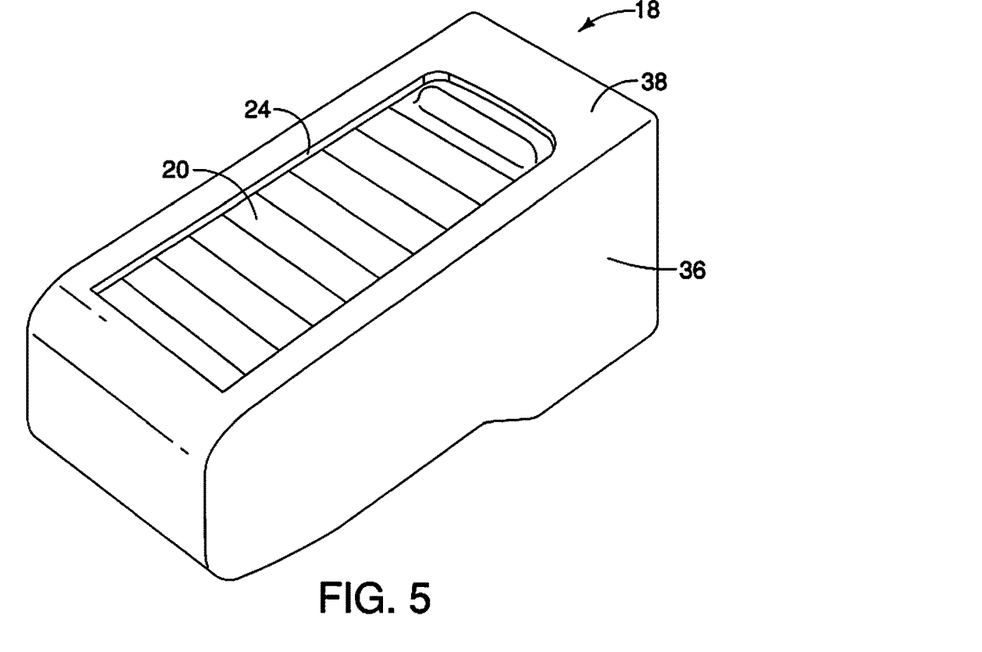
FIG. 5 is a perspective view of the storage compartment shown removed from the center console with the lid in the closed position in accordance with the first embodiment.
Figure 6:
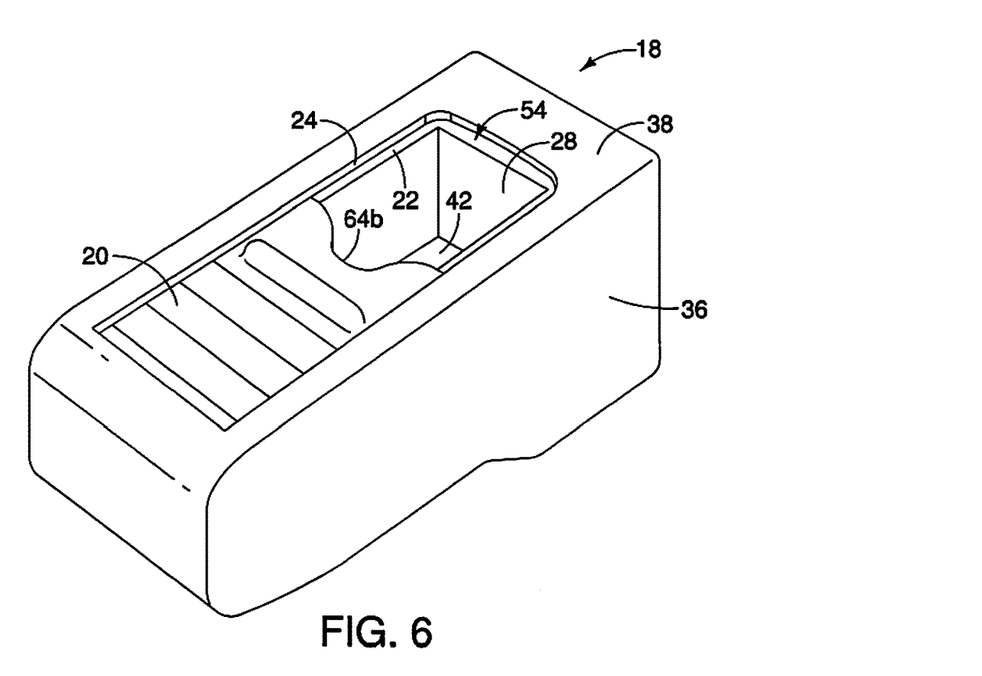
FIG. 6 is another perspective view of the storage compartment shown removed from the center console with the lid in the open position in accordance with the first embodiment.

As shown in FIGS. 3 and 4, the vehicle storage structure 12 includes a housing portion 18, a flexible lid 20 and tracks 22 (only a portion of one of the tracks 22 is visible in FIG. 4). The housing portion 18 includes an access opening 24 that permits access to a concealed storage compartment 28 (FIG. 4) that is covered by the flexible lid 20 with the flexible lid 20 in a closed position, as shown in FIG. 3. The flexible lid 20 is slidable along the tracks 22 between the closed position (FIG. 3) and fully open or partially open position (FIG. 4).

The housing portion 18 can be a single pre-formed carcass or can be a series of assembled panels, elements. In other words, the housing portion 18 can be constructed using any of a variety of design criteria, so long as the housing portion 18 includes structure that defines the tracks 22 that support the flexible lid 20 and related features that enable the housing portion 18 to receive differing sized liquid vessels, as described further herein below.

As shown in FIGS. 2, 3 and 4, the center console or the vehicle storage structure 12 can further include a side panels 30 (only one shown in FIG. 2), an optional hand brake receiving area 32 and a shifter receiving area 34. Since side panels 30, the hand brake receiving area 32 and the shifter receiving area 34 are conventional features of center console structures, further description is omitted for the sake of brevity.

Figure 7:
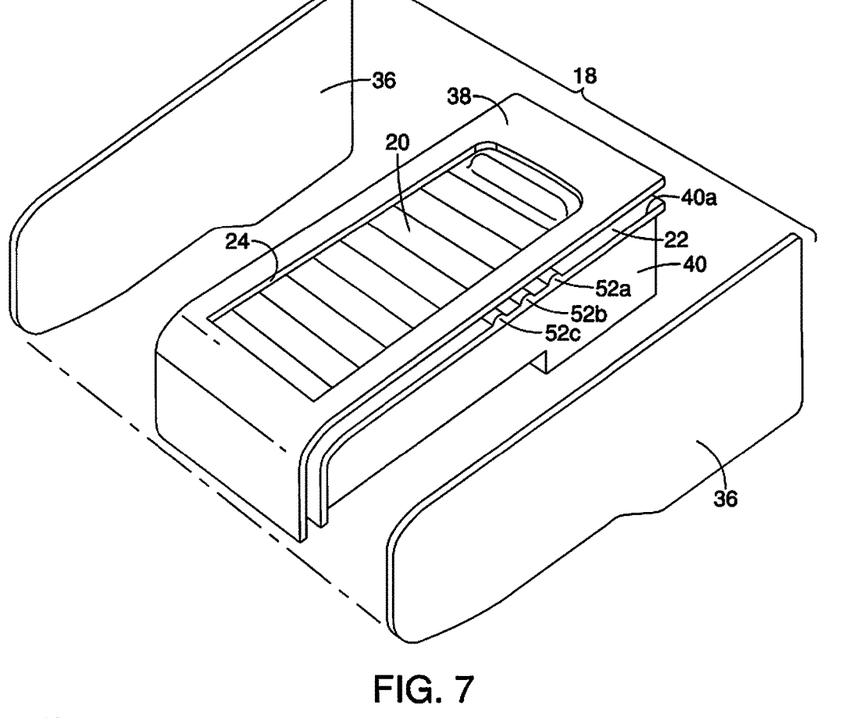
FIG. 7 is an exploded view of the storage compartment showing a housing portion, tracks, the lid and support side panels in accordance with the first embodiment.
Figure 8:
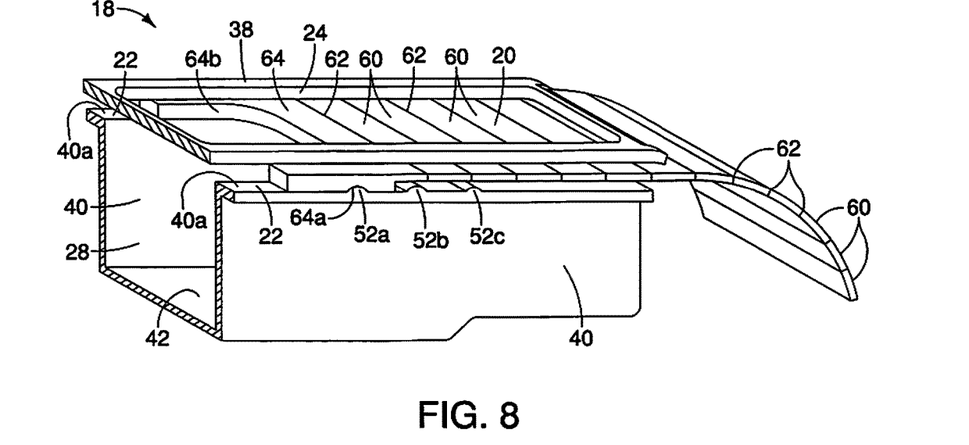
FIG. 8 is a cross-sectional and cut-away perspective view showing portions of the housing, the tracks and the lid in accordance with the first embodiment.

The housing portion 18 is shown removed from the vehicle storage structure 12 in schematic renderings in FIGS. 5-20. In the embodiment depicted in FIG. 7, the housing portion 18 includes two support side panels 36 that connect a top wall 38 to side walls 40. The top wall 38 is spaced apart from respective upper surfaces 40a of each of the side walls 40 defining the tracks 22 there-between, as indicated in FIGS. 7 and 8.

Figure 9:
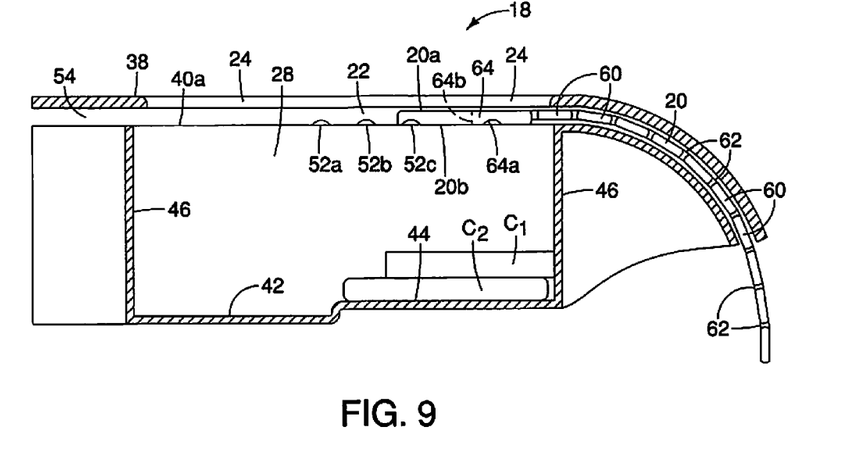
FIG. 9 is a cross-sectional side view of the housing portion and tracks showing the lid in one of the open positions in accordance with the first embodiment.
Figure 10:
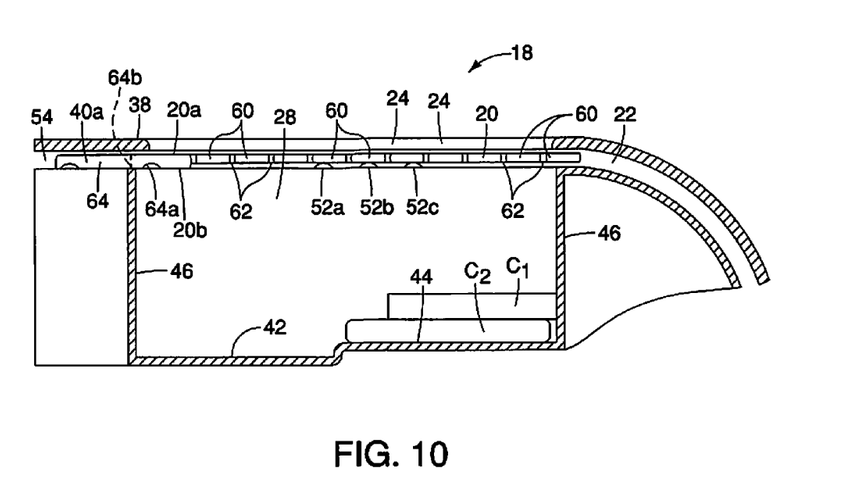
FIG. 10 is another cross-sectional side view of the housing portion and tracks showing the lid in the closed position in accordance with the first embodiment.
Figure 11:
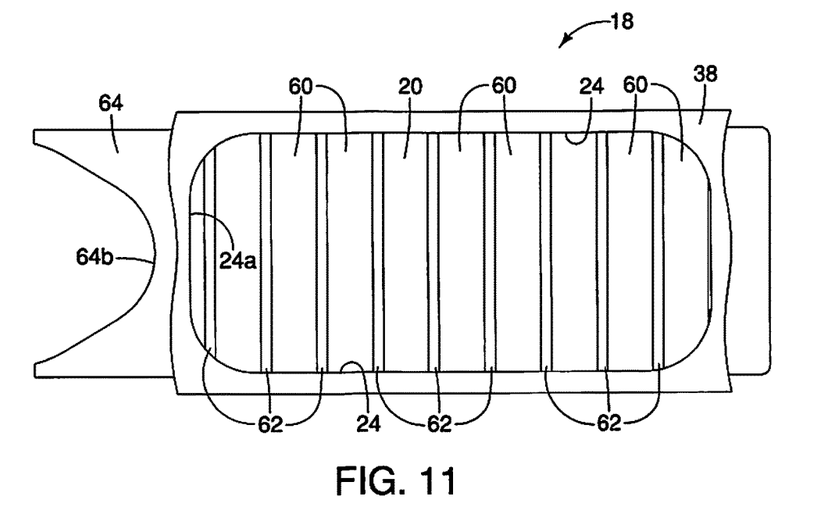
FIG. 11 is a top view the housing portion showing the lid in a closed position covering and concealing the storage compartment in accordance with the first embodiment.
Figure 12:
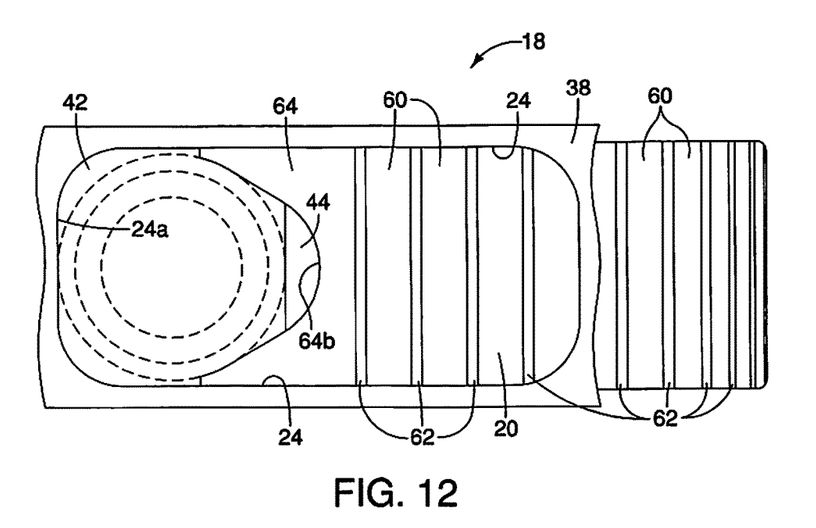
FIG. 12 is another top view of the housing portion showing the lid in one of the open positions at least partially exposing the storage compartment and defining a cup receiving space in accordance with the first embodiment.

As shown in cross-section in FIGS. 9 and 10, the housing portion 18 includes the top wall 38, the side walls 40 and further includes a compartment floor defined by a first floor portion 42 and a second floor portion 44. The first floor portion 42 and the second floor portion 44 define different depths within the housing portion 18, as is described in greater detail below. The housing portion 18 also includes end walls 46, as shown in FIGS. 9 and 10. The housing portion 18 basically defines and surrounds the concealed storage compartment 28.

The upper surfaces 40a of the side walls 40 include three stop protrusions 52a, 52b and 52c located within the tracks 22. The three stop protrusions 52a, 52b and 52c can be integrally formed with the side walls 40 or can be spring biased ball detents mechanically attached to the upper surfaces 40a. Alternatively, the side walls 40 can be made of a plastic or polymer material such the three stop protrusions 52a, 52b and 52c are inherently deformable and resilient. Consequently, regardless of the way they are manufactures, the three stop protrusions 52a, 52b and 52c define resiliently deformable lid detents. The purpose and function of the stop protrusions 52a, 52b and 52c (the resiliently deformable lid detents) is explained in greater detail below after a description of the lid 20.

As shown in FIGS. 9 and 10, the tracks 22 define a recessed area 54 forward of the access opening 24. More specifically, a forward portion of the housing portion 18 between the upper surfaces 40a of the side walls 40 and a lower surface of the top wall 35 is a recessed area 54 that is aligned with the tracks 22. When the lid 20 is in the fully closed position, a portion of the lid 20 is retained within the recessed area 54, as described in greater detail below.

The top wall 50 at least partially defines the access opening 24, which provides access to the concealed storage compartment 14 with the flexible lid 20 in the fully open or one of the partially open positions.

A description of the lid 20 is now provided with specific reference to FIGS. 8-13. The lid 20 includes a flexible portion and an end portion. More specifically, the flexible portion of the lid 20 is defined by a plurality of rigid slat elements 60 and a plurality of hinge portions 62. The end portion is defined by an end panel 64. Consequently, the lid 20 includes the plurality of rigid slat elements 60, the plurality of hinge portions 62 and the end panel 64. The end panel 64 and adjacent pairs of the rigid slat elements 60 are connected to one another by respective hinge portions 62. The rigid slat elements 60, the hinge portions 62 and the end panel 64 can be molded from a single material. For example, the lid 20 can be made of a polymer, plastic or resin material such that the slat elements 60 and the end panel 64 can be provided with a thickness sufficient to provide rigidity and the hinge portions 62 provided with a thinner profile thereby defining living hinges. Alternatively, the slat elements 60 and the end panel 64 can be separate rigid elements made of wood, plastic, polymer, metal, and/or combinations thereof that can optionally be coated with material to provide an attractive appearance. Alternatively, the hinge portions 62 can be mechanical hinges attached to the slat elements 20 or can be part of a material use to coat the slat elements 20 and/or the end panel 64. In other words, the lid 20 can be manufactured in any of a variety of ways depending upon desired appearance and/or desired strength.

Figure 13:
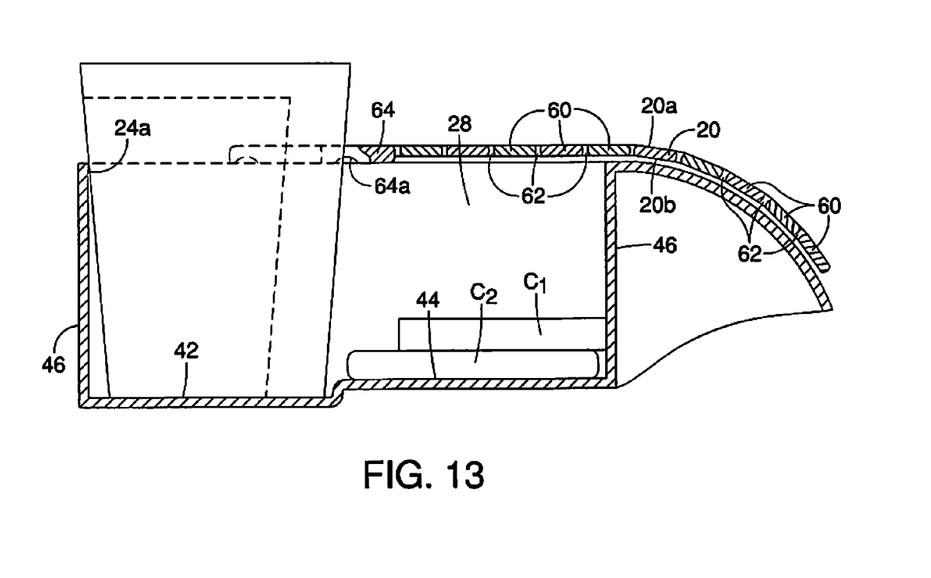
FIG. 13 is a cross-sectional side view of the housing portion showing the lid in one of the open positions defining the cup receiving space with an indication of several differing sized liquid vessels disposed within the cup receiving space in accordance with the first embodiment.

As is shown in FIGS. 9, 10 and 13, the lid 20 has an upper surface 20a and a lower surface 20b. FIGS. 6, 8, 9 and 10, lateral edges or lateral ends of the lid 20 extend into and are retained within the tracks 22 such that the lid 20 slides along the tracks 22 between the fully closed position, a fully open position and a plurality of partially open positions.

Figure 14:
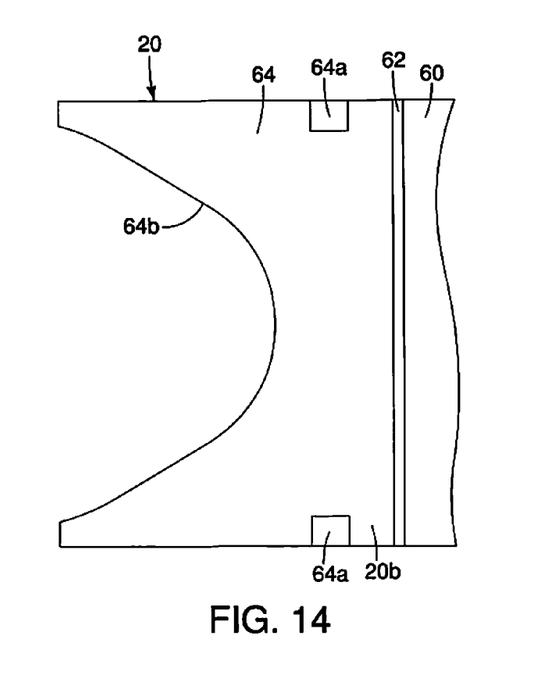
FIG. 14 is a bottom view of an end panel of the lid showing concave recesses and the shape of a concaved leading end thereof that at least partially defines the cup receiving space in accordance with the first embodiment.

As shown in FIG. 14, the lower surface 20b of the lid 20 at the end panel 64 includes a pair of concaved recesses 64a. The concaved recesses 64a are formed on areas of the lower surface 20b of the end panel 64 that is disposed within respective ones of the tracks 22. The concaved recesses 64a can alternatively be formed as a single concaved recess that extends the entire width of the end panel 64.

Figure 15:
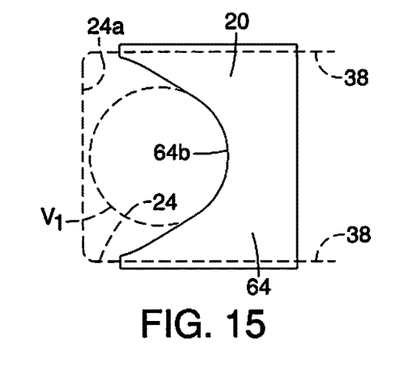
FIG. 15 is a schematic top view of an edge portion of the top of the housing portion and the concaved leading end of the lid with the lid in a first open position so that the cup receiving space is dimensioned to receive a first liquid vessel in accordance with the first embodiment.
Figure 16:
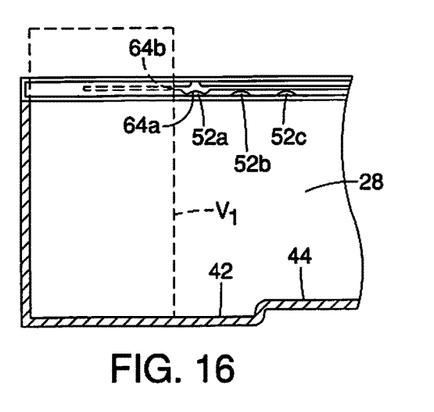
FIG. 16 is a schematic side view of the edge portion of the top of the housing portion and the concaved leading end of the lid with the lid in the first open position as depicted in FIG. 15, with the cup receiving space receiving the first liquid vessel in accordance with the first embodiment.
Figure 17:
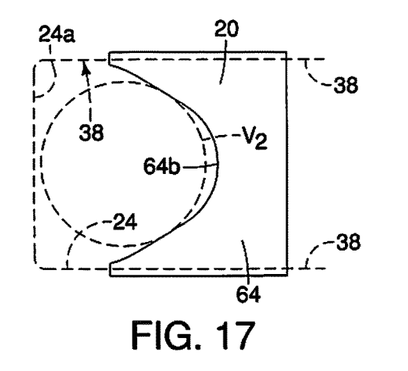
FIG. 17 is another schematic top view of the edge portion of the top of the housing portion and the concaved leading end of the lid with the lid in a second open position so that the cup receiving space is dimensioned to receive a second liquid vessel larger than the first liquid vessel in accordance with the first embodiment.
Figure 18:
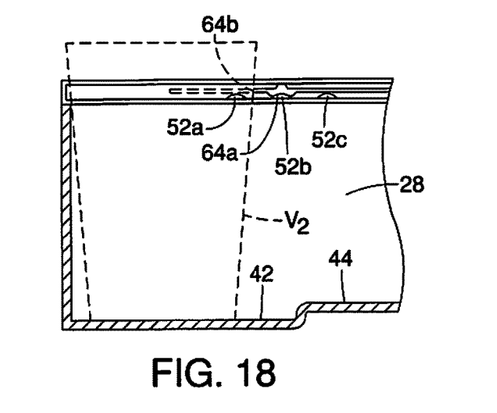
FIG. 18 is another schematic side view of the edge portion of the top of the housing portion and the concaved leading end of the lid with the lid in the second open position as depicted in FIG. 17, with the cup receiving space receiving the second liquid vessel in accordance with the first embodiment.
Figure 19:
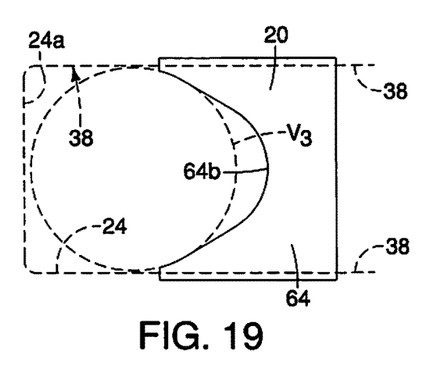
FIG. 19 is another schematic top view of the edge portion of the top of the housing portion and the concaved leading end of the lid with the lid in a third open position so that the cup receiving space is dimensioned to receive a third liquid vessel larger than the first and second liquid vessel in accordance with the first embodiment.
Figure 20:
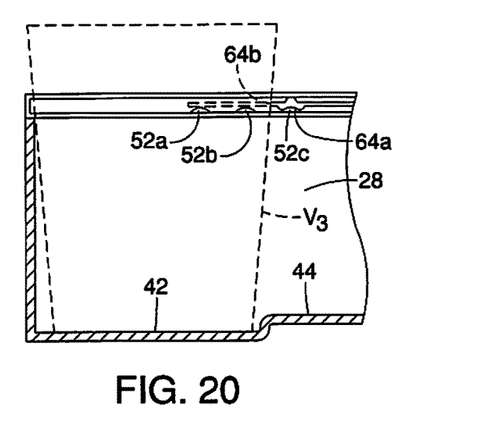
FIG. 20 is another schematic side view of the edge portion of the top of the housing portion and the concaved leading end of the lid with the lid in the third open position as depicted in FIG. 19, with the cup receiving space receiving the third liquid vessel in accordance with the first embodiment.

The concaved recesses 64a are dimensioned and positioned to interact with the stop protrusions 52a, 52b and 52c of the side walls 40. Specifically, when the lid 20 is moved such that the concaved recesses 64a are aligned and engaged with the stop protrusions 52a, the lid 20 is retained in a first partially open position, as shown in FIGS. 15 and 16. When the concaved recesses 64a are aligned and engaged with the stop protrusions 52b, the lid 20 is retained in a second partially open position, as shown in FIGS. 17 and 18. Further, when the concaved recesses 64a are aligned and engaged with the stop protrusions 52c, the lid 20 is retained in a third partially open position, as shown in FIGS. 19 and 20.

The forward end of the end panel 64 defines a concaved leading end 64b, as shown in FIGS. 11, 12, 14, 15, 17 and 19. In the first embodiment, the concave leading end 64b has an overall U-shape. The concave leading end 64b of the end panel 64 of the lid and a forward edge portion 24a (FIGS. 15, 17 and 19) of the access opening 24 cooperate to define a cup holder space that varies in size, depending upon the position of the lid 20.

FIGS. 15-20 show the lid 20 in three different partially open positions (intermediate positions), as described above. In the first partially open position shown in FIGS. 15 and 16, the concaved leading end 64b of the lid 20 and the first edge portion 24a of the access opening 24 in the top wall 38 dimension and define the cup holder space to receive and surround a first removable liquid vessel $V_1$. The first removable liquid vessel $V_1$ has a first diameter. The first floor portion 42 (lower than the second floor portion 44). As is shown in FIG. 16, the first removable liquid vessel $V_1$ rests on the first floor portion 42, and can only undergo limited side to side or front to back movement due to the close proximity of the concaved leading end 64b of the lid 20 and the first edge portion 24a of the access opening 24. In essence, the size of the cup holder space defined between the concaved leading end 64b of the lid 20 and the first edge portion 24a of the access opening 24 is only slightly larger than the diameter of the first removable liquid vessel $V_1$.

In the second partially open position shown in FIGS. 17 and 18, the concaved leading end 64b of the lid 20 and the first edge portion 24a of the access opening 24 in the top wall 38 re-dimension and re-define the cup holder space to receive and surround a second removable liquid vessel $V_2$ that is larger than the first removable liquid vessel $V_1$. The second removable liquid vessel $V_2$ has a second diameter that is larger than the first diameter of the first removable liquid vessel $V_1$.

As is shown in FIG. 18, the second removable liquid vessel $V_2$ rests on the first floor portion 42, and can only undergo limited side to side or front to back movement due to the close proximity of the concaved leading end 64b of the lid 20 and the first edge portion 24a of the access opening 24 with the lid in the second partially open position.

The size of the cup holder space defined between the concaved leading end 64b of the lid 20 and the first edge portion 24a of the access opening 24 with the lid in the second partially open position shown in FIGS. 17 and 18 is only slightly larger than the diameter of the second removable liquid vessel $V_2$.

In the third partially open position shown in FIGS. 19 and 20, the concaved leading end 64b of the lid 20 and the first edge portion 24a of the access opening 24 in the top wall 38 again re-dimension and re-define the cup holder space to receive and surround a third removable liquid vessel $V_3$ that is larger than the first and second removable liquid vessels $V_1$ and $V_2$. The third removable liquid vessel $V_3$ has a third diameter that is larger than the first diameter of the first removable liquid vessel $V_1$ and the second diameter of the second removable liquid vessel $V_2$.

As is shown in FIG. 20, the third removable liquid vessel $V_3$ rests completely on the first floor portion 42, and can only undergo limited side to side or front to back movement due to the close proximity of the concaved leading end 64b of the lid 20 and the first edge portion 24a of the access opening 24 with the lid in the third partially open position.

The size of the cup holder space defined between the concaved leading end 64b of the lid 20 and the first edge portion 24a of the access opening 24 with the lid 20 in the third partially open position shown in FIGS. 19 and 20 is only slightly larger than the diameter of the third removable liquid vessel $V_3$.

As described above, the cup holder space defined between the concaved leading end 64b of the lid 20 and the first edge portion 24a of the access opening 24 can have three completely different overall sizes depending upon the position of the lid 20 relative to the stop protrusions 52a, 52b and 52c in the tracks 22.

As is shown in, for example, FIGS. 9, 10, 13, various objects can be stored in the concealed storage compartment 28, such as the mobile phone $C_1$ and/or a notebook $C_2$. Such objects can rest on the second floor portion 44 separated from the liquid vessels $V_1$, $V_2$ or $V_3$, resting on the first floor portion 42 without interference.

In the first embodiment, the concave leading end 64b of the end panel 64 of the lid 20 is preferably provided with a U-shape, as shown in FIG. 14, in order to define the cup holder space for conical and/or cylindrically shaped liquid vessels, such as the vessels $V_1$, $V_2$, and $V_3$. The vessels $V_1$, $V_2$, and $V_3$ can be, for example, beverage filled cans, paper cups, or insulated thermos devices. However, the overall shape of the concave leading end 64*b* of the end panel 64 of the lid 20 is not limited to a U-shape or a semi-circular shape, as shown in the alternate embodiments described below.

As mentioned above, the housing portion 18 can be constructed using any of a variety of construction techniques and assembly designs. For example, the tracks 22 described above can be separate elements that are inserted into and attach to the structures that form the housing portion 18 in a manner consistent with the tracks disclosed in commonly assigned U.S. Pat. No. 7,721,926, to Thomas, and/or U.S. Pat. No. 7,287,795, also to Thomas. Specifically, each of the tracks disclosed in U.S. Pat. No. 7,721,926 and U.S. Pat. No. 7,287,795 can be modified to include the stop protrusions 52*a*, 52*b* and 52*c* of the present disclosure and can then be used with the lid 20. The disclosures of U.S. Pat. No. 7,721,926 and U.S. Pat. No. 7,287,795 are incorporated herein by reference in their entirety, in particular with respect to their respective teachings of tracks that support a sliding lid or sliding cover.

Second Embodiment

Figure 21:
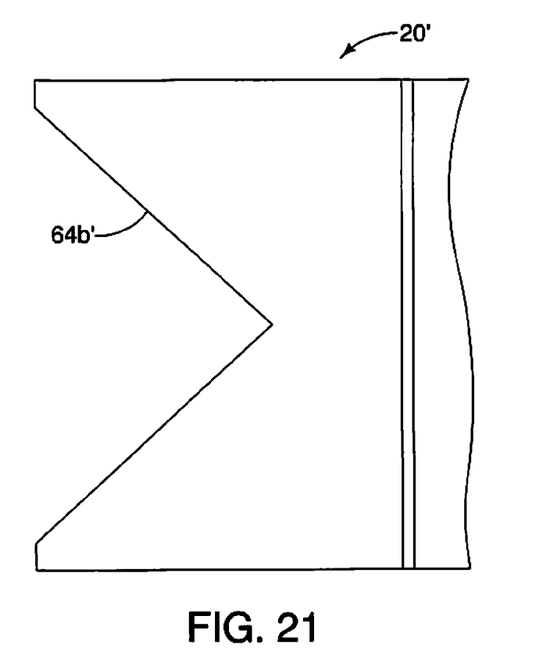
FIG. 21 is a top view of an end panel of a lid having a concave leading end with a V-shape in accordance with a second embodiment.

Referring now to FIG. 21, a lid 20' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment the lid 20' includes and end panel with a concaved leading end 64*b*' that has an overall V-shape. Otherwise, the lid 20' is identical to the lid 20 described above with respect to the first embodiment.

Third Embodiment

Figure 22:
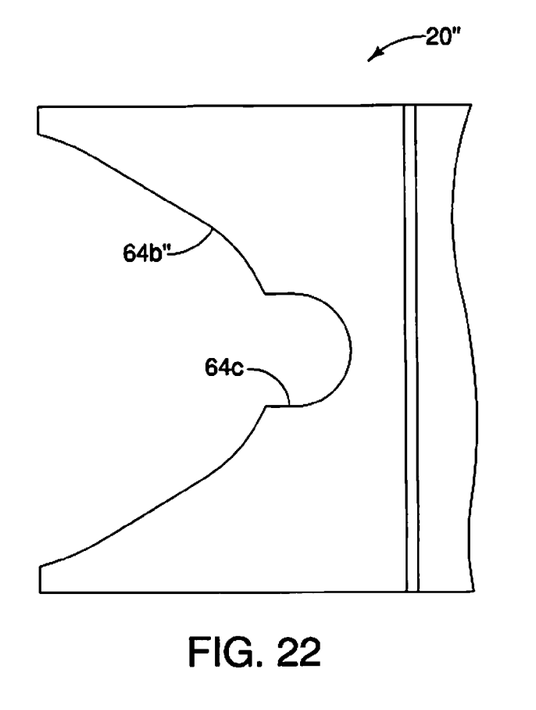
FIG. 22 is a top view of an end panel of a lid having a concave leading end with a Y-shape in accordance with a third embodiment.

Referring now to FIG. 22, a lid 20" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment the lid 20" includes and end panel with a concaved leading end 64*b*" that has an overall Y-shape. More specifically, the concaved leading end 64*b*" has the U-shape (or semi-circular shape) of the concaved leading end 64*b* of the first embodiment, but includes a further concave area 64*c* that is shaped and dimensioned to receive a handle portion of a mug, cup or thermos. In other words, there are liquid vessels such as mugs, cups and/or thermos' that include handles along an upright side thereof. The concave area 64*c* of the concaved leading end 64*b*" of the lid 20" is provided so that such liquid vessels can be place in the corresponding cup holder space so that the handle does not interfere with placement of the liquid vessel into the cup holder space.

Otherwise, the lid 20" is identical to the lid 20 described above with respect to the first embodiment.

Fourth Embodiment

Figure 23:
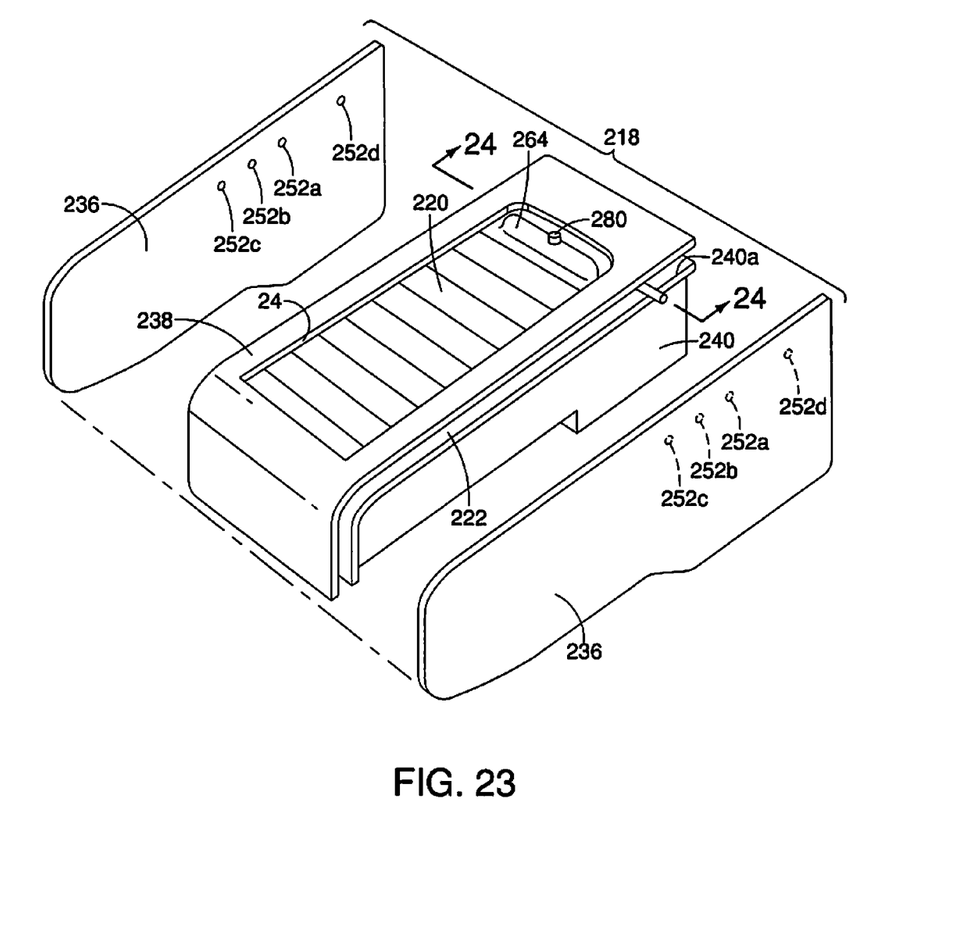
FIG. 23 is an exploded view of a storage compartment showing a housing portion, tracks, a lid and support side panels in accordance with a fourth embodiment.
Figure 24:
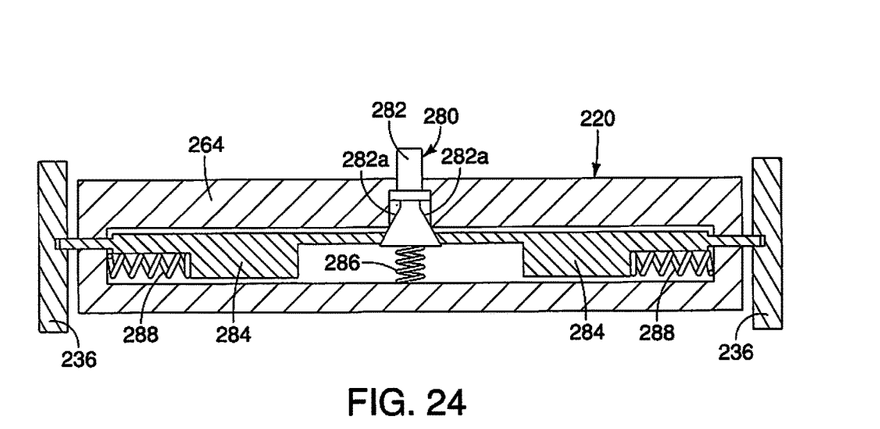
FIG. 24 is a cross-sectional view of the storage compartment taken along the line 24-24 in FIG. 23, showing details of a lid position locking mechanism in a locked orientation in accordance with the fourth embodiment.
Figure 25:
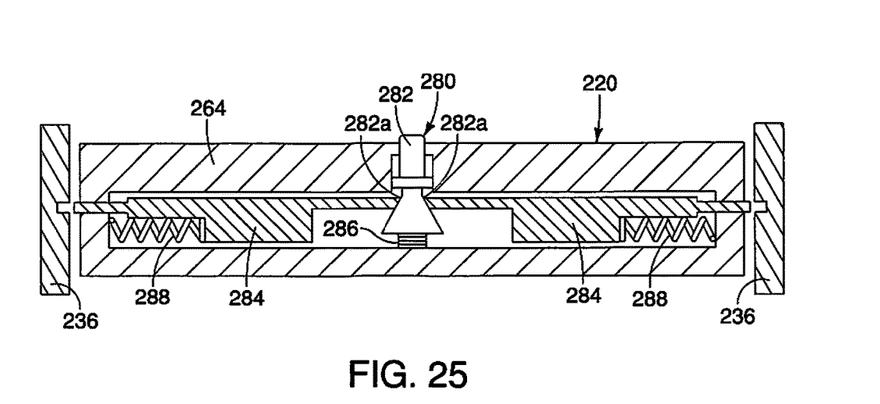
FIG. 25 is another cross-sectional view of the storage compartment similar to FIG. 24, showing details of the lid position locking mechanism in a unlocked orientation in accordance with the fourth embodiment.

Referring now to FIGS. 23-25, a housing portion 218 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The housing portion 218 replaces the housing portion 18 of the first embodiment and includes a sliding lid 220 that replaces the lid 20 of the first embodiment. The housing portion 218 is shown in a schematic rendering in FIGS. 23-25. The housing portion 218 includes two support side panels 236 that connect a top wall 238 to side walls 240. The top wall 238 is spaced apart from respective upper surfaces 240*a* of each of the side walls 240 defining the tracks 222 there-between.

Each of the two side panels 236 is provided with a plurality of stop openings 252*a*, 252*b*, 252*c* and 252*d* that functionally replace the three stop protrusions 52*a*, 52*b* and 52*c* of the first embodiment.

In the fourth embodiment, the lid 220 includes the slat elements 90 and the hinge portions 62 of the first embodiment. However, the end panel 64 of the first embodiment is replaced with an end panel 264. Although not shown in FIGS. 23-25, the end panel 264 includes the concaved leading end 64*b* as described above with respect to the first embodiment.

The end panel 264 is shown in cross-section in FIGS. 24 and 25. The end panel 264 includes a positioning mechanism 280 that cooperates with the plurality of stop openings 252*a*, 252*b*, 252*c* and 252*d* in the support side panels 236.

The positioning mechanism 280 of the end panel 264 includes a release button 282, a pair of pin members 284 and biasing springs 286 and 288. The release button 282 includes cam surfaces 282*a*. The release button 282 is biased into a locked position via the biasing spring 286. The pin members 284 are biased toward a release orientation by biasing strings 288. As shown in FIG. 24, in a locked position, the release button 282 is in the locked position. Therefore, the biasing spring 286 has urged the release button 282 upward. In this position, the cam surfaces 282*a* are positioned to push the pin members 284 into one of the plurality of stop openings 252*a*, 252*b*, 252*c* and 252*d*, preventing movement of the sliding lid 220. In this position, the springs 288 are compressed. It should be understood from the drawings and the description herein that the spring 286 is provided with a greater positioning urging force than the springs 288.

As shown in FIG. 25, the release button 282 is pressed, compressing the spring 286, thereby allowing the force of the springs 288 to urge the pin members 284 out of the corresponding ones of the plurality of stop openings 252*a*, 252*b*, 252*c* and 252*d* making sliding movement of the lid 220 possible.

The plurality of stop openings 252*a*, 252*b*, 252*c* and 252*d* are positioned as follows. When the pin members 284 are positioned to extend into the stop openings 252*a*, the lid 220 is retained in the first partially open position corresponding to the position shown in FIGS. 15 and 16 of the first embodiment. When the pin members 284 are positioned to extend into the stop openings 252b, the lid 220 is retained in the second partially open position corresponding to the position shown in FIGS. 17 and 18 of the first embodiment. When the pin members 284 are positioned to extend into the stop openings 252c, the lid 220 is retained in the third partially open position corresponding to the position shown in FIGS. 19 and 20 of the first embodiment. Further, when the pin members 284 are positioned to extend into the stop openings 252d, the lid 220 is retained in a completely closed position corresponding to the position shown in FIG. 23.

The various vehicle elements and features shown in the drawings (other than the storage structure 12) are conventional components that are well known in the art. Since such vehicle elements and features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle storage structure. Accordingly, these terms, as utilized to describe the present invention should be interpreted relative to a vehicle equipped with the vehicle storage structure.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle storage structure, comprising:
    a housing structure defining a storage compartment and having a top wall with an opening above the storage compartment, the top wall having a first edge portion that partially defines the opening;
    a pair of tracks located within the housing structure with at least a section of each of the pair of tracks extending along opposite sides of the opening; and
    a lid including an end portion and a flexible portion connected to one another for movement together as a single element, the flexible portion having lateral edges that extend into respective ones of the pair of tracks for selective sliding movement along the pair of tracks between a fully closed position blocking access to the storage compartment via the opening, a fully open position exposing the storage compartment via the opening and a plurality of intermediate positions between the fully closed position and the fully open position, the end portion having a concave leading end such that with the lid in a first of the plurality of intermediate positions the concaved leading end and the first edge portion of the opening in the top wall define a cup holder space configured to receive and surround a first removable liquid vessel.

2. The vehicle storage structure according to claim 1, wherein
    the storage compartment has a compartment floor with at least a portion thereof defining a cup receiving surface that defines a bottom end of the cup holder space such that the removable liquid vessel rests on the cup receiving surface when inserted into the cup holder space.

3. The vehicle storage structure according to claim 1, wherein
    at least one of the tracks includes a first resiliently deformable lid detent, and
    the end portion of the lid includes concave recess such that with the concave recess being engaged with the first resiliently deformable lid detent the lid is retained in the first of the plurality of intermediate positions.

4. The vehicle storage structure according to claim 3, wherein
    at least one of the tracks includes a second resiliently deformable lid detent spaced apart from the first resiliently deformable lid detent, such that with the concave recess being engaged with the second resiliently deformable lid detent the lid is retained in a second of the plurality of intermediate positions spaced apart from the first of plurality of intermediate positions such that the cup holder space between the concaved leading end and the first edge portion of the opening in the top wall is re-defined to receive and surround a second removable liquid vessel larger that the first removable vessel.

5. The vehicle storage structure according to claim 4, wherein
    the housing structure is configured such that with the lid retained in the first of the plurality of intermediate positions, the cup holder space is dimensioned to receive the first removable vessel where the first removable vessel has a first diameter.

6. The vehicle storage structure according to claim 5, wherein
the housing structure is configured such that with the lid retained in the second of the plurality of intermediate positions, the cup holder structure space is dimensioned to receive the second removable vessel where the second removable vessel has a second diameter larger than the first diameter.

7. The vehicle storage structure according to claim 4, wherein
at least one of the tracks includes a third resiliently deformable lid detent spaced apart from the first and second resiliently deformable lid detents, such that with the concave recess being engaged with the third resiliently deformable lid detent the lid is retained in a third of the plurality of intermediate positions spaced apart from the first and second of plurality of intermediate positions such that the cup holder space between the concaved leading end and the first edge portion of the opening in the top wall is re-defined to receive and surround a third removable liquid vessel larger that the first and second removable vessels.

8. The vehicle storage structure according to claim 7, wherein
the housing structure is configured such that with the lid retained in the first of the plurality of intermediate positions, the cup holder space is dimensioned to receive the first removable vessel where the first removable vessel has a first diameter.

9. The vehicle storage structure according to claim 8, wherein
the housing structure is configured such that with the lid retained in the second of the plurality of intermediate positions, the cup holder structure space is dimensioned to receive the second removable vessel where the second removable vessel has a second diameter larger than the first diameter.

10. The vehicle storage structure according to claim 8, wherein
the housing structure is configured such that with the lid retained in the third of the plurality of intermediate positions, the cup holder structure space is dimensioned to receive the third removable vessel where the third removable vessel has a third diameter larger than the first and second diameters.

11. The vehicle storage structure according to claim 1, wherein
the housing structure includes a recessed area beneath the top wall and adjacent to the first edge portion and between the pair of tracks, the recessed area being configured and dimensioned such that with the lid in the fully closed position at least a portion of the end portion of the lid extends into the recessed area completely concealing the concave leading end.

12. The vehicle storage structure according to claim 1, wherein
the concave leading end of the end portion of the lid has a semi-circular shape as viewed from above.

13. The vehicle storage structure according to claim 1, wherein
the concave leading end of the end portion of the lid has a V-shape as viewed from above.

14. The vehicle storage structure according to claim 1, wherein
the concave leading end of the end portion of the lid has a Y-shape as viewed from above.

15. The vehicle storage structure according to claim 1, wherein
the end portion of the lid includes a positioning mechanism configured to move from a position locking orientation to a position releasing orientation, such that with the positioning mechanism in the positioning locking orientation the lid is prevented from sliding.

16. The vehicle storage structure according to claim 15, wherein
the housing portion includes a plurality of apertures located along at least one of the tracks, and the positioning mechanism includes at least one movable pin member such that with the pin member inserted into one of the plurality of apertures the positioning mechanism is in the position locking orientation.

17. The vehicle storage structure according to claim 16, wherein
the housing portion is configured such that with the movable pin member extending into a first of the plurality of apertures, the lid is retained in the first of the plurality of intermediate positions.

18. The vehicle storage structure according to claim 17, wherein
the housing portion is configured such that with the movable pin member extending into a second of the plurality of apertures, the lid is retained in a second of the plurality of intermediate positions.

19. The vehicle storage structure according to claim 18, wherein
the housing portion is configured such that with the movable pin member extending into a third of the plurality of apertures, the lid is retained in a third of the plurality of intermediate positions.

20. The vehicle storage structure according to claim 19, wherein
the housing portion is configured such that with the movable pin member extending into a fourth of the plurality of apertures, the lid is retained in the fully closed position.

* * * * *